United States Patent [19]

Bergman

[11] 4,298,307
[45] Nov. 3, 1981

[54] AIR FLOAT POWER ROTATION SYSTEM

[76] Inventor: Raymond A. Bergman, 107 E. Second St., Minster, Ohio 45865

[21] Appl. No.: 88,772

[22] Filed: Oct. 29, 1979

Related U.S. Application Data

[60] Continuation-in-part of Ser. No. 924,958, Jul. 17, 1978, Pat. No. 4,179,106, which is a continuation of Ser. No. 815,676, Jul. 14, 1977, abandoned, which is a division of Ser. No. 684,725, May 5, 1976, Pat. No. 4,058,885.

[51] Int. Cl.$^3$ .............................................. B23Q 7/00
[52] U.S. Cl. ..................................... 414/676; 104/36; 198/344; 269/20; 414/744 R
[58] Field of Search ................... 414/676, 677, 744 R, 414/754; 83/402; 269/20; 198/344, 345, 394; 104/35, 36, 46

[56] References Cited

U.S. PATENT DOCUMENTS

| | | | |
|---|---|---|---|
| 589,724 | 9/1897 | Hess | 104/36 |
| 1,469,085 | 9/1923 | Hawthorne et al. | 414/754 |
| 2,877,538 | 3/1959 | Conlon | 269/20 X |
| 3,209,623 | 10/1965 | Schardt | 269/20 X |
| 3,986,617 | 10/1976 | Blomquist | 414/744 R X |
| 4,058,885 | 11/1977 | Bergman | 269/20 X |
| 4,143,868 | 3/1979 | Bergman | 269/20 |

Primary Examiner—Leslie J. Paperner
Attorney, Agent, or Firm—Albert L. Jeffers; John F. Hoffman

[57] ABSTRACT

A power rotation apparatus for an air float fixture support system of the type including a table having an upwardly facing upper surface adapted for supporting a workpiece fixture thereon, and a pressurized fluid system for supplying a cushion of pressurized air or other fluid between the surface of the table and the workpiece fixture so as to floatingly support the fixture thereon for virtually friction-free movement. The power rotation apparatus comprises one or more pins rotatably mounted within the table and having a portion thereof extending upwardly from the table surface, and a motor-gear or hydraulic direct drive arrangement within the table for rotating the pin or pins about respective axes normal to the upper surface of the table. The pin is suitably shaped so that it is keyed to an opening, such as a slot, in the lower surface of the fixture thereby causing the fluid support fixture to be rotated in unison with the pin. In a preferred form of the invention, the pin is provided with a square-shaped upper end having a side length equal to the width of the slot. The pin may be provided with a retractable inner pin, and the outer pin itself may also be retractable.

20 Claims, 11 Drawing Figures

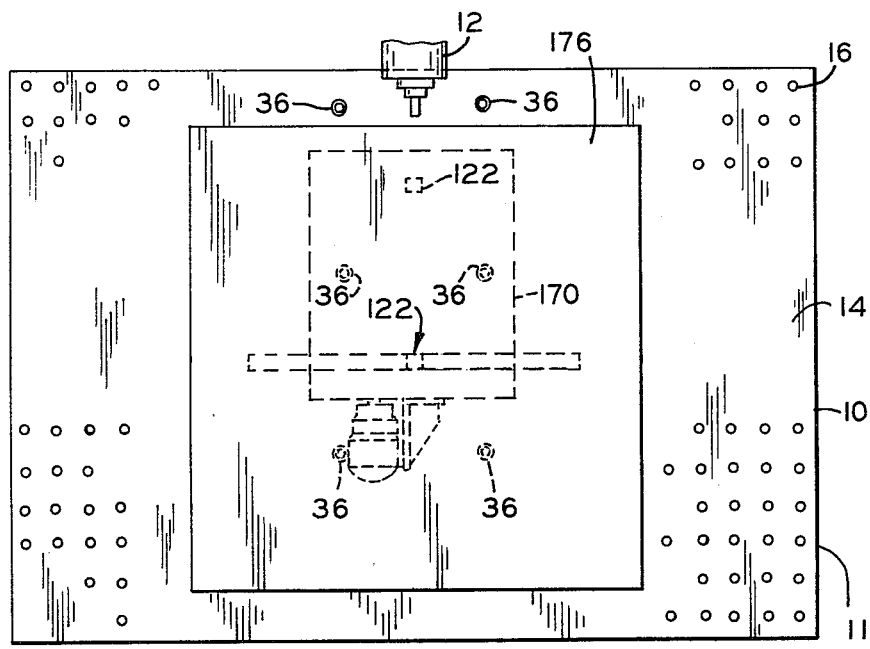
FIG. 7
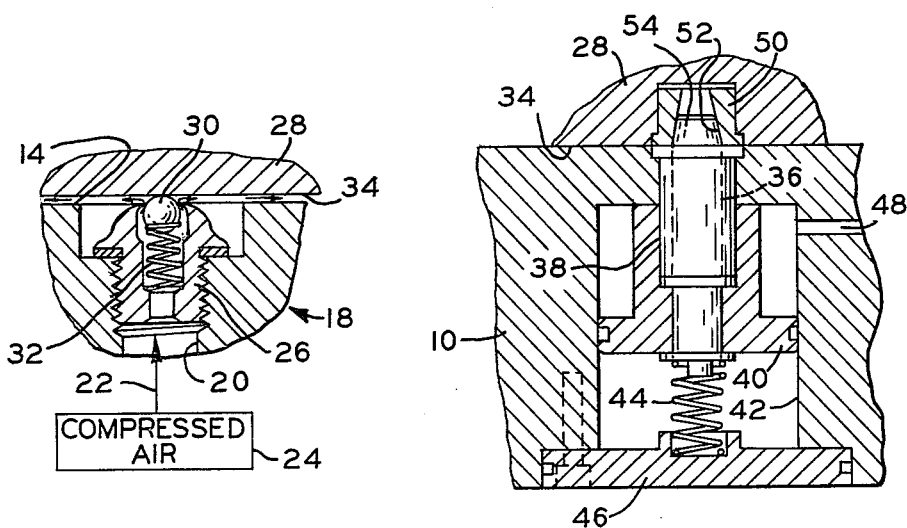
FIG. 8
FIG. 9

AIR FLOAT POWER ROTATION SYSTEM

CROSS REFERENCE TO RELATED APPLICATIONS

This is a continuation-in-part of application Ser. No. 924,958 filed July 17, 1978, now U.S. Pat. No. 4,179,106 which is a continuation of application Ser. No. 815,676 filed July 14, 1977 now abandoned, which is a division of application Ser. No. 684,725 filed May 5, 1976 now U.S. Pat. No. 4,058,885.

BACKGROUND OF THE INVENTION

The present invention relates to a pressurized fluid fixture support system for machine tool and other environments, and in particular to a power rotation apparatus wherein the workpiece fixture may be automatically rotated about one or more selected centers of rotation on the table.

The machining of large workpieces often involves very difficult positioning and repositioning of the workpiece when the various portions thereof are machined. In many cases, it is necessary to use hoists for elevating and moving the workpiece both to and from the machine tool table, and on the table itself where repositioning is necessary for sequential machining steps.

In order to overcome these problems, an air-float system, wherein the workpiece is mounted to a fixture which in turn is supported on a film of pressurized air, has been developed. This system is described in detail in U.S. Pat. No. 4,058,885 in the name of Raymond A. Bergman, which patent is incorporated herein by reference. In the system, a table is provided with fluid passages and a plurality of fluid outlets distributed over the surface of the table so that a cushion of pressurized air may be provided underneath the workpiece fixture. By virtue of the fluid pressure film, substantially friction-free movement of the fixture on the table is possible thereby permitting positioning and repositioning to be accomplished by a single operator without the need for hoisting equipment.

In order for the fixture to be rotated and translated from one position to another, the table may be provided with one or more retractable pivot pins which project upwardly from the table surface. The pins may either be receivable in a socket in the bottom of the fixture, in which case the fixture is constrained to move circularly on the table as it is manually turned, or, alternatively, they may be received in one or more slots so that the fixture is not only rotatable but also translatable. Cooperating pairs of retractable pin and socket locating devices on the fixture and table provide for accurate location of the fixture in a variety of predetermined positions. Clamps may also be provided for clamping the fixture in the located positions during machining. The clamps may be of the conventional T-slot type, the bayonet type as described in U.S. patent application Ser. No. 829,358 filed Aug. 31, 1977 in the name of Raymond A. Bergman, or of the automatic retracting T-clamp type disclosed in copending U.S. patent application Ser. No. 40,072 filed May 17, 1979.

The table may be provided with a dual centering pin feature, as disclosed in U.S. Pat. No. 4,143,868, if additional flexibility is desired in positioning and locating the fixture. The dual centering pin comprises an outer pin which is engagable with the fixture slots, and an inner pin received within the outer pin with means for causing the inner pin to extend upwardly out of the outer pin so as to engage holes in the slots. When the inner pin is retracted, the workpiece fixture is translatable on the table in engagment with the outer pin, and when the inner pin is extended and received within one of the fixture holes within the slots, the fixture may be rotated about it to the desired position.

It is often desirable to machine more than one side of a workpiece with a single setup, for example, when drilling bolt holes. This is especially desirable in the case where the part may have many sides, such as octagonal parts, and wherein the machining operation is the same for each side.

An apparatus commonly used for this purpose is a rotary table, wherein the top plate is rotated about a single center axis in front of the machine tool or tools. Thus, each side of the workpiece is presented to the tool in sequential fashion as the table surface is rotated. Such an apparatus is also useful for machining relatively small parts in high production environments. In this case, two or more parts are mounted to the table in back-to-back fashion, and machined in turn. A rotary table also finds use in machining operations where a plurality of different machining functions are performed sequentially, as by different machine tools placed around the perimeter of the rotary table and machining the part simultaneously or sequentially.

Although a rotary table is very useful for certain selected operations, such as those discussed above, it lacks versatility in that it is not suitable for a great many machining operations wherein the part size is not compatible with the table size, or where only one machining operation is to be performed on the part at that station. Furthermore, typical rotary tables are expensive and quite large in size, thereby making them unattractive except for certain selected machining operations.

Thus, there exists a great need for a machine tool table which is relatively modest in cost and of a small size, yet possessing many of the advantages of rotary tables, such as the ability to rapidly and efficiently machine multi-sided parts. Also, since numerical control machining installations are becoming more and more common, such a table should be compatible with an automatic control environment.

SUMMARY OF THE INVENTION

The present invention overcomes the problems and disadvantages of prior art rotary tables and fulfills the need for a machine tool table which can function both in the ordinary non-rotary environment, as well as a low cost rotary table. The system according to the present invention comprises a table wherein a cushion of pressurized air or other fluid is supplied to the surface thereof through a plurality of openings so that the fixture to which the workpiece is mounted can be moved about in a virtually friction-free fashion. The table includes a plurality of retractable locating pins positioned at precisely determined locations, and which selectively interengage with corresponding openings in the lower surface of the workpiece fixture so as to accurately lock the fixture in place. The fixture may be moved over the surface of the table in either a manual translational or manual rotational mode by virtue of rotation/translation pins engaging holes and slots, respectively, in the lower surface of the workpiece fixture. When positioned at the desired location, the fixture may be clamped therein by any one of the clamping devices discussed above.

In order to automatically rotate the fixture about a desired center of rotation, the present invention provides a keying element in the nature of a square-sided pin which engages a complementary shaped opening or slot in the lower surface of the fixture. Means are provided within the table for turning the square-sided pin about a vertical axis, and when the fixture is supported on a cushion of pressurized fluid, it will be rotated in unison with the pin to the desired location. The degree of rotation effected by the pin may be accurately controlled by conventional numerical control systems which can impart to the pin a precise degree of rotation. Once the fixture is rotated to the desired position, it may be accurately located and locked in place by means of the locating pin arrangement referred to above and described in detail in the aforementioned U.S. Pat. No. 4,058,885.

In order to provide for the rotation of the fixture about different centers of rotation, as would be the case where fixtures of different sizes were used, a plurality of automatically rotated pins may be provided in the table. Such an arrangement is extremely advantageous from the standpoint of flexibility in that it enables both large and small parts to be brought close to the machining head without the necessity for spindle extensions and the like.

Specifically, the present invention contemplates a pressurized fluid support system comprising a support table having a generally flat upper surface adapted for supporting a workpiece fixture thereon, means for supplying a cushion of fixture supporting pressurized fluid to the surface of the table whereby a workpiece fixture may be floatingly supported thereon, a keying element rotatably mounted within the table and having a portion thereof extending upwardly from the table upper surface and having a non-circular cross-sectional shape within a plane parallel to the table surface whereby it is capable of keying to the overlying workpiece fixture, and means within the table for rotating the keying element about an axis normal to the upper surface of the table.

Perhaps the primary advantage to the invention is its simplicity and low cost when compared with standard rotary tables, which are quite expensive and of large size. Furthermore, the table is extremely flexible in that it enables rotary as well as non-rotary setups to be performed by the same piece of apparatus. Furthermore, the part can be translated from one position to another on the table and rotated in a plurality of positions merely by changing its location on the table and activating the appropriate centering/rotating/locating elements.

In the case of smaller table-type machines, the fixture is capable of supporting two or more pieces in back-to-back relationship so that sequential machining of the parts can be accomplished with a single setup. The system is easily adaptable to numerical control which would cause rough positioning through the action of the rotating pin, and then very accurate location by actuating one or more locating pins, which would engage their respective openings in the lower surface of the fixture.

The system is also adaptable to an automatic clamping environment wherein T-clamps are disposed within a large radius circular T-slot in the lower surface of the fixture, and are retracted downwardly toward the table thereby clamping the fixture in place. Thus, the fixture and part can be rotated to the desired positions with extremely good accuracy without the necessity for manual intervention on the part of the operator.

BRIEF DESCRIPTION OF THE DRAWINGS

FIG. 7 is a plan view of the power rotation apparatus wherein a larger fixture plate is supported on the table;

FIG. 8 is a sectional view taken along line 8—8 of FIG. 1 and viewed in the direction of the arrows; and FIG. 9 is a sectional view taken along line 9—9 of FIG. 1 and viewed in the direction of the arrows.

DETAILED DESCRIPTION

Figure 1:
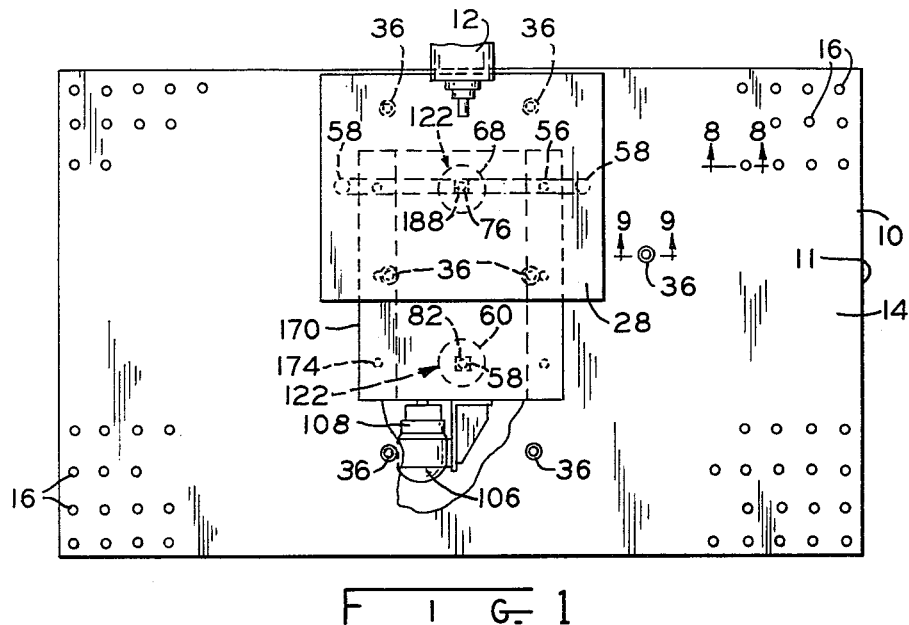
FIG. 1 is a plan view of an air-float system and power rotation apparatus according to one embodiment of the present invention.

Referring now to the drawings, there is illustrated in FIG. 1 an air-float machine tool table 10 positioned in front of a machine tool head 12. Table 10 is generally of the type described in the aforementioned U.S. Pat. No. 4,058,885, and includes a planar upper surface 14 provided with a plurality of openings 16 distributed over the surface 14 of the table 10 and having ball check valves 18 installed therein (FIG. 8).

With reference to FIG. 8, table 10 is provided with a network of passageways 20 communicating with a supply conduit 22 connected via a control valve (not shown) with a supply of fluid under pressure 24, such as air supplied from an air compressor. The upper end of each passage 20 is closed by valve 18 comprising a body 26 threaded into the upper end of passage 20, the top thereof being disposed below the level of table surface 14 so that no obstructions are presented to the workpiece fixture 28 supported thereon. A steel ball 30 is captured and seated within body 26 and urged into its closed and seated position by spring 32. Ball 30 projects upwardly beyond surface 14 a slight distance so that it will be contacted and unseated by the fixture 28 as it passes thereover. This will permit pressurized fluid to flow through body 26 to the surface 14 of table 10 thereby establishing a fluid film between the upper surface 14 of table 10 and the lower surface 34 of fixture 28. The cushion of air will floatingly support fixture 28 so that the fixture-workpiece combination can easily be moved about on table 10. It is preferred that fixture 28 be in the form of a suitably dimensioned steel or cast iron plate having a generally flat lower surface 34 and a means on the upper surface thereof so that the workpiece (not shown) may be clamped or otherwise secured thereto.

Table 10 is also equipped with a plurality of locating pins 36, which are located in accurately determined positions on table 10 so that the fixture may be precisely located for machining of the workpiece. Referring to FIG. 9, locating pin 36 is slidably received within bushing 38 and connected to piston 40. Piston 40 reciprocates within bore 42 and is biased upwardly by spring 44, bore 42 being closed at its lower end by vented plate 46. In order to retract pin 36, fluid pressure is admitted to bore 42 through passageway 48. The lower surface 34 of fixture 28 is provided with a plurality of accurately located bushings 50 having tapered inner surfaces 52 adapted for the seating of the tapered upper end 54 of locating pins 36.

The location of bushings 50 and locating pins 36 will depend upon the desired positions in which fixture 28 is to be accurately located for machining of the workpiece mounted thereon. It will be appreciated that only two locating pins 36 and two locating bushings 50 are needed to accurately locate the fixture 28 in a given location.

Although not shown in the present application, the table 10 may also include a plurality of additional centering pins and translation pins for the purpose of permitting manual rotation about a variety of centers and translation along a variety of rectilinear paths. The use of such centering pins and translation pins is described more fully in the aforementioned U.S. Pat. No. 4,058,885. The fixture plate 28 may be clamped in place by means of one of the clamping devices described earlier. For example, table 10 may be provided with bayonet clamp openings (not shown) adapted for the insertion of bayonet clamps of the type described in application Ser. No. 835,826, or with the T-clamp system described in the aforementioned application Ser. No. 40,072 filed May 17, 1979.

Figure 3:
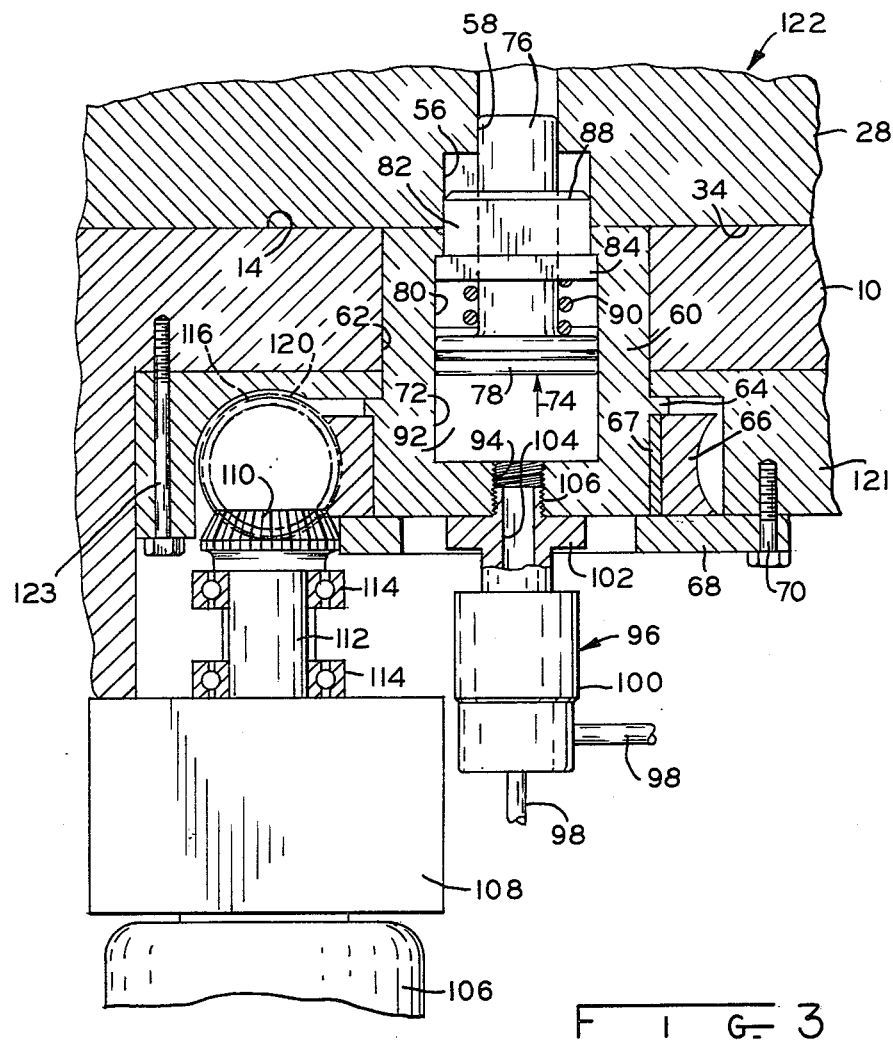
FIG. 3 is a sectional view taken along line 3—3 of FIG. 2 and viewed in the direction of the arrows.

With reference to FIGS. 1 and 3, fixture plate 28 will be seen to comprise a rectangular steel plate having a slot 56 in its lower surface 34, with holes 58 located at the ends and center thereof. The upper surface of fixture 28 is adapted to have a workpiece (not shown), such as a part to be drilled or milled, clamped or bolted thereto. Any number of tapered bushings 50 may be provided on the underneath surface 34 of fixture 28, depending on the variety of locating positions which are necessary for the particular machine tool station.

Figure 2:
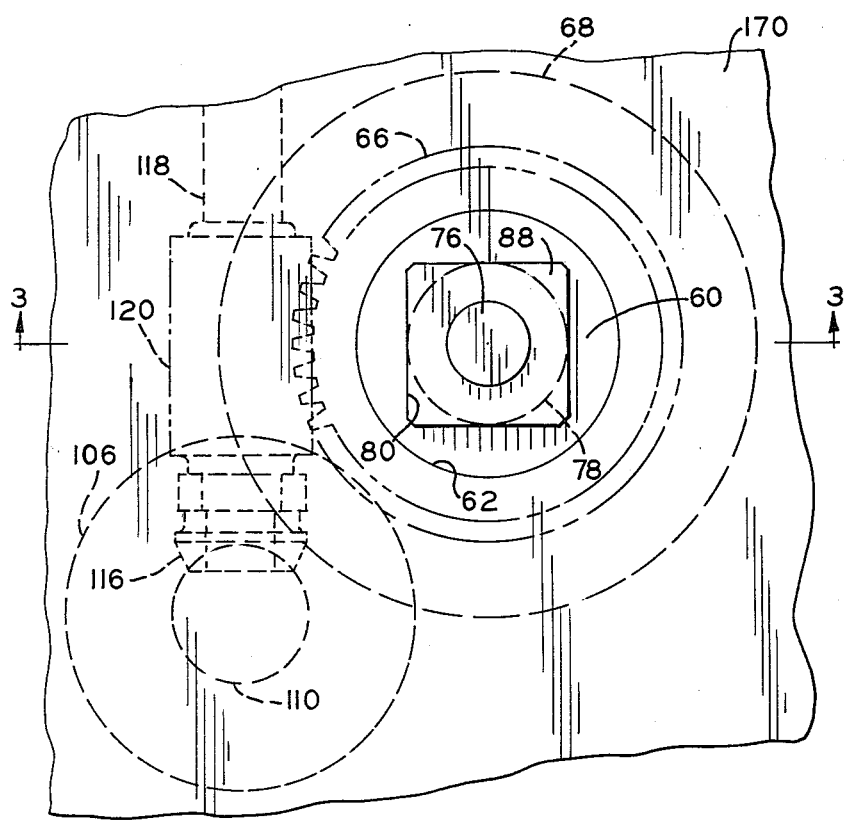
FIG. 2 is an enlarged plan view of one of the rotation pins.

Referring to FIGS. 2 and 3, the power rotation apparatus according to the present invention comprises a cylinder 60 received within an opening 62 in table 10, which is in the nature of a large steel plate. Cylinder 60 is seated within opening 62 flush with the upper surface 14 of table 10 by means of flange portion 64. A worm wheel 66 is keyed to cylinder 60 by key 67, and this assembly is held in place by retainer plate 68. Retainer plate 68 is held in place by screws 70. Received within the bore 72 of cylinder 60 is a piston 74 having an integral inner pin portion 76 extending upwardly from the flange portion 78. Inner pin 76 is circular in cross-section and is adapted to fit into holes 58 with relatively close clearance.

Bore 72 is circular in cross-section so as to accommodate circular piston 78, but the upper portion 80 thereof is square in cross-section so as to provide a snug fit for outer pin 82, which is square in cross-section in a plane parallel to the plane of table upper surface 14 as illustrated in FIG. 2. Outer pin 82 is reciprocably received within the square bore 80 and includes a base portion 84 which is larger in diameter than the upper portion 88. Upper portion 88 is dimensioned such that its side length is approximately equal to the width of slot 56 so that there is a relatively close clearance between it and slot 56. A coil spring 90 is positioned between outer pin 82 and the flange portion 78 of piston 74, and serves to cause outer pin 82 to be projected upwardly when inner pin 76 is extended. Due to the snug fit between bore 80 and outer pin 82, it will remain in its upper position as shown in FIG. 3 unless depressed manually, even though inner pin 76 may be retracted.

Piston 74 and inner pin 76 are extended by means of hydraulic or pneumatic fluid introduced into chamber 92 through passageway 94. Due to the fact that cylinder 60 rotates, as will be described in detail hereinafter, a rotary union device 96 must be provided for conveying the hydraulic or pneumatic fluid from lines 98 to chamber 92. Such rotating hydraulic unions 96 are commercially available, for example the Deu-Plex union manufactured by Deublin Company of Northbrook, Illinois, and comprise a stationary housing 100 to which hydraulic lines 98 are attached, and a rotor 102 having a hydraulic passageway 104 connecting with passageway 94 through fitting 106. Rotor 102 is capable of rotating relative to housing 100 without interrupting the supply of hydraulic fluid to chamber 92. When hydraulic fluid under pressure is introduced into chamber 92, piston 78 will be forced upwardly thereby compressing spring 90 so as to cause outer pin 82 to project upwardly into slot 56. If inner pin 76 is positioned beneath one of the holes 58 in slot 56, then it too will be projected upwardly as illustrated in FIG. 3. When hydraulic fluid is vented from chamber 92, spring 90 will cause inner pin 76 to retract, and outer pin 82 can be lowered flush with or below the upper surface 14 of table 10 by manually pressing it downward into table 10.

Since outer pin 82 is square and fits snugly within slot 56 and square bore 80, as outer pin 82 is rotated by cylinder 60, fixture 56 will be carried with it, provided that the air system has been pressurized. The driving system for the rotation of cylinder 60 comprises an electric motor 106 drivingly connected to an electric clutch 108, the latter being drivingly connected to bevel gear 110 through shaft 112, the latter being supported by bearings 114. Bevel gear 110 intermeshes with a second bevel gear 116 (FIG. 2), which is keyed to shaft 118. Worm gear 120 is also keyed to shaft 118 and is in intermeshing engagement with worm wheel 66. By this arrangement, worm wheel 68 is driven by motor 106 and the intermediate gear train and, by virtue of its being keyed to cylinder 60, will cause rotation of cylinder 60 and outer pin 82. Motor 106 may be of the reversible type so that rotation in either direction is possible. The pin assembly of FIG. 3 may be connected to table 10 by a cartridge 121 by screws 123.

Figure 4:
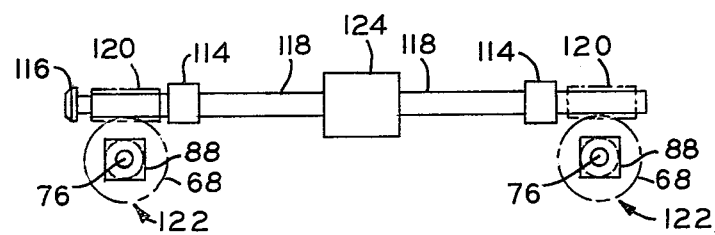
FIG. 4 is a diagrammatic view of a dual rotation pin apparatus according to the present invention.
Figure 6:
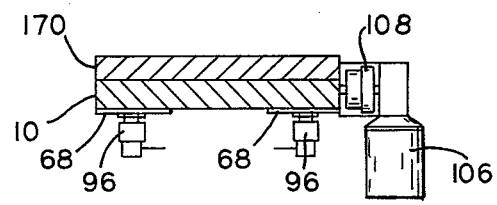
FIG. 6 is a sectional view of the power rotation plate assembly shown in FIG. 1.

In order to enable rotation to be accomplished about two centers so as to accommodate more than one size of fixture 28, a second dual pin arrangement 122 is provided (FIG. 1). FIG. 4 illustrates the manner of driving the two dual pin arrangements, which will be seen to comprise an electric clutch 124 selectively connecting shafts 118 so that the cylinders 60 may be driven simultaneously, if desired. FIG. 6 illustrates the two rotating hydraulic unions 96 needed to supply hydraulic fluid to the cylinder 60.

Figure 5:
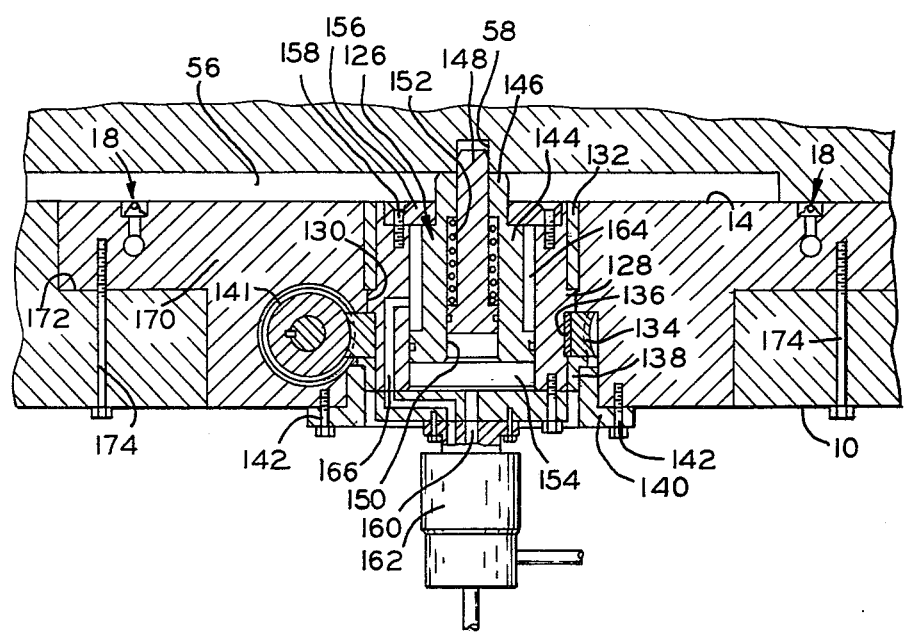
FIG. 5 is a sectional view of another embodiment of the invention.

FIG. 5 illustrates an alternative embodiment of the invention whereby the outer pin 126 can be automatically retracted below the surface 14 of table 10 so that the fixture plate 28 can be floated into place, rather than being lowered over the extended outer pin (FIG. 3) by a gantry crane. This embodiment comprises a cylinder 128 rotatably received within bore 130 for rotation about a vertical axis, and including insert 132. Cylinder 128 is keyed to worm wheel 134 by key 136, and this assembly is held in place by insert 138 and flanged retaining ring 140. Gear 141 drives worm wheel 134, and screws 142 hold retaining ring 140 in place. Inserts 132 and 138 serve as bearings to permit free rotation of cylinder 128 within bore 130.

Outer pin 126 includes a cylindrical lower portion 144 and a square upper portion 146, the latter having a side length equal to the width of slot 56. Inner pin 148 is reciprocably received within the bore 150 of outer pin 126, and a compression coil spring 152 causes inner pin 148 to retract unless chamber 154 is pressurized. Plate 156 connected to cylinder 130 by screws 158 serves as the upper stop for outer pin 126. Fluid pressure is conveyed to chamber 154 through passageway 160 from dual passage rotating hydraulic union 162. When hydraulic pressure is admitted to chamber 154, outer pin 126 and inner pin 148 will be projected upwardly with outer pin 126 being received within slot 56 and inner pin 148 being received within one of the round openings 58 in slot 56. If it is desired to retract the inner and outer pins 126 and 148, fluid pressure is admitted to chamber 164 through fluid passageway 166. As was the case with the previous embodiment illustrated in FIG. 1, with outer pin 146 received in slot 56, as cylinder 128 rotates, fixture 28 will rotate in unison therewith if it is supported on a cushion of pressurized air.

For ease in manufacturing and maintenance, the dual rotation pin apparatus may be contained within a separate plate 170 seated on shoulders 172 and connected to table 10 by screws 174.

FIG. 7 illustrates the manner in which a larger fixture plate 176 can be supported on table 10 for rotation about the dual rotation pin apparatus 122 located further from tool head 12. Rather than requiring a larger rotary table, as is the case with existing rotary tables, this changeover can be made simply by substituting the larger fixture 176 for the smaller fixture 28 previously used.

With reference to the embodiment illustrated in FIG. 5, once the fixture 28 is positioned with the square outer pin 146 received in slot 56, it can be rotated to any desired position by establishing a cushion of pressurized air between the lower surface 34 of the fixture 28 and the upper surface 14 of table 10, and activating clutch 108 so that cylinder 128 begins to rotate about a vertical axis substantially normal to the surface 14 of table 10. The degree of rotation could be controlled by a numerical control system, or selected locating pins 36 could be activated so that they are urged against the lower surface of fixture 28, and will project into their respective bushings 50 when the fixture 28 has attained the desired rotational position. The cushion of pressurized air is then terminated so as to allow the fixture 28 to rest directly on the upper surface 14 of table 10. At this point, the fixture 28 may be clamped in place and the part machined. To move the fixture 28 to the next desired rotational position, it is unclamped, the cushion of pressurized air is again established between it and table 10, and cylinder 128 is rotated to the extent necessary.

The apparatus also permits translation of fixture 28 on table 10 along the rectilinear path defined by slot 56 riding over outer pin 146. With chamber 154 pressurized with hydraulic fluid, when inner pin 148 is positioned beneath an opening 56 in fixture 28, it will snap into place thereby establishing the new center of rotation. The fixture 28 may be translated anywhere on table 10 by retracting outer pin 126 so that it is clear of slot 56. In this case, however, some sort of capturing or restricting means will be necessary to prevent the fixture 28 from sliding off table 10. For example, the elimination of air valves 18 one foot to one and one-half foot from the edges 11 of table 10 is very effective in preventing the pallet 28 from sliding off.

Although outer pin 144 has been shown and described as being square, any shape whereby it can be keyed to slot 56 or another suitable opening in the lower surface 34 of fixture 28 can be used so long as the required keying between the pin and fixture is accomplished. For example, a hexagonal pin and square-sided slot would also work, although the degree of mechanical interlocking between the pin and slot would not be as great as in the case where a square slot were used. Furthermore, the outer pin could be rectangular if greater interlocking strength is desired.

In order to prevent chips and other debris from lodging within the slight recess provided when the outer pins 146 and 82 are retracted, removable covers (not shown) flush with the upper surface of plate 170 could be provided.

Figure 10:
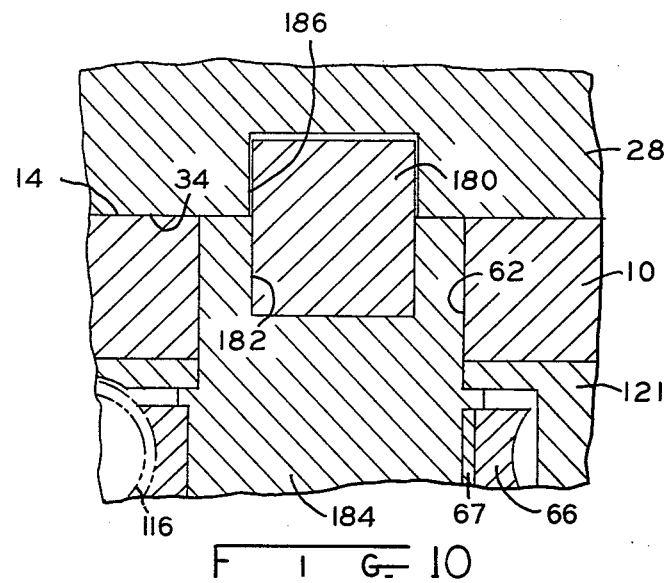
FIGS. 10 and 11 are sectional and plan views, respectively, of a modification.
Figure 11:
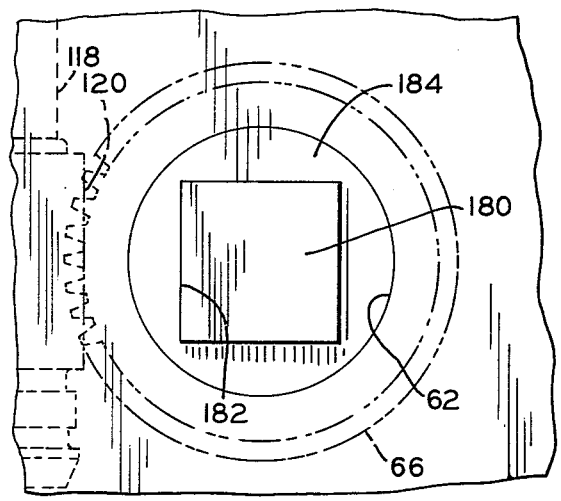

A further modification to the invention is shown in FIGS. 10 and 11 wherein the same reference numerals have been used for corresponding parts originally shown in FIG. 3. Rather than having a retractable dual pin as in the case of the previous embodiments, this modification provides for a removable square sided pin 180 received within a square recess 182 within insert 184. Insert 184 is very similar to cylinder 60 (FIG. 3) and is driven by worm 116 and worm gear 66 in the same manner as cylinder 60.

By providing a plurality of such inserts 184 distributed over table 10, rotation about a plurality of centers can be achieved simply by relocating pin 180. For example, if it is desired to machine a relatively small part, then pin 180 would be inserted within the square recess 182 of an insert 184 located close to tool 12. For larger workpieces, the pin would be inserted in an insert located a greater distance from tool 12. Because the pins 180 are removable, there would be no obstructions projecting above the surface 14 of table 10 to interfer with rotation of the workpiece fixture 28.

Each of the workpiece fixtures 28 would include a square recess 186 dimensioned such that it will be engaged by the protruding portion of pin 180. Due to the fact that there is no concentric inner pin, such as pin 76 (FIG. 3), to locate the fixture for rotation about a given center, it is preferred that the fixture be provided with square recesses 186, rather than slots as was the case with the previous embodiments.

In a further modification, it would be possible to replace the entire motor drive and reciprocating pin arrangement previously disclosed with a single, self-contained hydraulic rotary motor wherein a single spindle would be moved forward and backward either by a mechanical or hydraulic system, and wherein the spindle would be rotated by a hydraulic motor. In this embodiment, the spindle would be oriented vertically and would include either a permanent or removable pin which would then be projected above the surface of the table for engagement with the workpiece fixture and retracted when not in use.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A pressurized fluid support system comprising:
   a support table having a generally flat upper surface adapted for supporting a workpiece fixture thereon,
   means for supplying a cushion of fixture supporting pressurized fluid to the surface of the table whereby a workpiece fixture may be floatingly supported thereon,
   keying element means rotatably mounted within said table and having a portion thereof extending upwardly from said table under surface, the portion of said keying element means extending from the table surface having a non-circular cross-sectional shape within a plane parallel to the table surface whereby the keying element means is capable of keying to an overlying workpiece fixture,
   means within said table for rotating said keying element means relative to said table about an axis normal to the upper surface of said table, and
   a workpiece fixture having a lower surface supported on said table upper surface on the cushion of pressurized fluid, and including an opening in said lower surface keyed to said keying element means so that said fixture will be rotated by said keying element means,
   said keying element means comprising a pin mounted for retraction to a position flush with or below the table upper surface.

2. The system of claim 1 wherein said fixture opening is a slot and said keying element includes an upper portion which is square and has a side length substantially equal to the width of said slot.

3. The system of claim 1 including means for one retracting or extending said pin by means of fluid pressure.

4. The system of claim 1 wherein: said means for rotating said keying element means comprises a motor and a gear train operably connected between said motor and keying element means, and including fluid pressure means for retracting said pin, said fluid pressure means for retracting including a piston and cylinder arrangement for retracting said pin and rotating fluid union means for conveying fluid to said cylinder.

5. The system of claim 1 wherein said keying element means comprises a pin removably received within a socket means located within said table, said socket means being rotated by said means for rotating said keying element means.

6. A pressurized fluid support system comprising:
   a support table having a generally flat upper surface adapted for supporting a workpiece fixture thereon,
   a workpiece fixture having a downwardly facing lower surface on said table upper surface, said fixture having an elongated slot in the lower surface thereof,
   means for supplying a cushion of pressurized air between the fixture and table surfaces so as to floatingly support the fixture for movement over the upper surface of the table,
   keying element means rotatably mounted within said table and having a portion thereof extending upwardly from the table upper surface,
   means within said table for rotating said keying element means about an axis normal to the upper surface of said table,
   means for selectively retracting said keying element means to a position flush with or below the table upper surface,
   said keying element means being received in and keyed to said workpiece fixture slot so that said fixture will be rotated by said keying element means, said slot and keying element means being relatively slidable so that said fixture is capable of sliding movement in the horizontal direction along the axis of said slot while keyed by said keying element means, and
   cooperating means on said keying element means and within said slot for locking said keying element means and fixture against movement along the axis of the slot.

7. The system of claim 6 wherein the slot has longitudinal sides, said keying element means comprises a pin having a noncircular cross-sectional shape within a plane parallel to and above the upper surface of the table including at least two substantially flat sides adapted to engage the longitudinal sides of the slot when the keying element means is rotated, whereby said fixture may be translated and rotated on said table.

8. The system of claim 6 including a plurality of said keying element means mounted in said table thereby establishing a plurality of centers of rotation, and wherein said keying element means are retractable to positions flush with or below the upper surface of the table.

9. The system of claim 6 wherein said keying element means comprises a pin having an upper end which is substantially square in cross-section in a plane parallel to the upper surface of the table.

10. The system of claim 6 wherein said means for rotating said keying element means comprises a motor and a gear train operably connected between said motor and said keying element means.

11. The system of claim 6 including at least one locating pin on said table projecting upwardly from the table upper surface and engagable with a corresponding locating opening in the lower surface of the workpiece fixture, and including means for selectively retracting said locating pin to a position flush with or below the table upper surface.

12. The system of claim 11 including a plurality of said locating pins and said locating openings.

13. A pressurized fluid support system comprising:
   a support table having a generally flat upper surface adapted for supporting a workpiece fixture thereon,
   means for supplying a cushion of fixture supporting pressurized fluid to the surface of the table whereby a workpiece fixture may be floatingly supported thereon,
   keying element means rotatably mounted within said table and having a portion thereof extending upwardly from said table upper surface, a portion of said keying element means extending from the table surface having a non-circular cross-sectional shape within a plane parallel to the table surface whereby the keying element means is capable of keying to an overlying workpiece fixture, said keying element means comprising a pin mounted for retraction to a position flush with or below the table upper surface,
   means for one of retracting or extending said pin by means of fluid pressure, and an inner pin concentric with and reciprocably mounted in said first mentioned pin.

14. A pressurized fluid support system comprising:

a support table having a generally flat upper surface adapted for supporting a workpiece fixture thereon, a workpiece fixture having a downwardly facing lower surface on said table upper surface, said fixture having an opening in the lower surface thereof, means for supplying a cushion of pressurized air between the fixture and table surfaces so as to floatingly support the fixture for movement over the upper surface of the table, keying element means rotatably mounted within said table and having a portion thereof extending upwardly from the table upper surface, means within said table for rotating said keying element means about an axis normal to the upper surface of said table, said keying element means being received in and keyed to said workpiece fixture opening so that said fixture will be rotated by said keying element means, the opening in said fixture lower surface being a slot having longitudinal sides, said keying element means comprising a pin having a noncircular cross-sectional shape within a plane parallel to and above the upper surface of the table including at least two substantially flat sides adapted to engage the longitudinal sides of the slot when the keying element means is rotated, whereby said fixture may be translated and rotated on said table;

an inner pin mounted concentrically within said first mentioned pin for vertical movement, and at least one opening in said slot engageable by said inner pin.

15. The system of claim 14 including a plurality of openings in said slot engageable by said inner pin.

16. The system of claim 14 wherein said first mentioned pin is mounted within said table for vertical movement, and including means for actuating said pins by fluid pressure to move vertically.

17. The system of claim 16 wherein said means for actuating said pins comprises a piston and cylinder arrangement and rotating fluid union means for conveying fluid to said piston and cylinder arrangement.

18. The system of claim 14 wherein said means for retracting includes a piston and cylinder arrangement and fluid union means for conveying pressurized fluid to said piston and cylinder arrangement.

19. A pressurized fluid support system comprising:

a support table having a generally flat upper surface adapted for supporting a workpiece fixture thereon, a workpiece fixture having a downwardly facing lower surface on said table upper surface, said fixture having an opening in the lower surface thereof, means for supplying a cushion of pressurized air between the fixture and table surfaces so as to floatingly support the fixture for movement over the upper surface of the table, keying element means rotatably mounted within said table and having a portion thereof extending upwardly from the table upper surface, means within said table for rotating said keying element means about an axis normal to the upper surface of said table, said keying element means being received in and keyed to said workpiece fixture opening so that said fixture will be rotated by said keying element means, said keying element means comprising a pin having an upper end which is substantially rectangular in cross-section in a plane parallel to the upper surface of the table; and a vertically retractable inner pin mounted within the first mentioned pin.

20. The system of claim 19 wherein said keying element pin is substantially square in cross-section.

* * * * *

UNITED STATES PATENT AND TRADEMARK OFFICE
CERTIFICATE OF CORRECTION

PATENT NO. : 4,298,307
DATED : November 3, 1981
INVENTOR(S) : Raymond A. Bergman It is certified that error appears in the above—identified patent and that said Letters Patent is hereby corrected as shown below:

Claim 1, Column 9, line 12, change "under" to --upper--

Claim 3, Column 9, line 35, insert --of-- between "one" and "retracting"

Signed and Sealed this

Ninth Day of February 1982

[SEAL]

Attest:

GERALD J. MOSSINGHOFF

Attesting Officer    Commissioner of Patents and Trademarks